US007962496B2

(12) United States Patent
Gu et al.

(10) Patent No.: US 7,962,496 B2
(45) Date of Patent: Jun. 14, 2011

(54) MIGRATING PERSONALITY OF COMPUTING ENVIRONMENT FROM SOURCE PLATFORM TO TARGET PLATFORM

(75) Inventors: Guang Dao Gu, Beijing (CN); Hui Su, Beijing (CN); Zhe Peng Wang, Beijing (CN); Xiao Bing Guo, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 11/188,371

(22) Filed: Jul. 25, 2005

(65) Prior Publication Data

US 2006/0026195 A1 Feb. 2, 2006

(30) Foreign Application Priority Data

Jul. 26, 2004 (CN) .......................... 2004 1 0054936

(51) Int. Cl.
G06F 7/00 (2006.01)
G06F 17/30 (2006.01)
(52) U.S. Cl. .................... 707/756; 707/803; 707/805
(58) Field of Classification Search .................. None
See application file for complete search history.

(56) References Cited

U.S. PATENT DOCUMENTS

| | | | | |
|---|---|---|---|---|
| 5,793,965 A * | 8/1998 | Vanderbilt et al. | ............ | 709/203 |
| 5,937,411 A * | 8/1999 | Becker | ................... | 1/1 |
| 6,275,944 B1 * | 8/2001 | Kao et al. | ......................... | 726/36 |
| 6,292,889 B1 * | 9/2001 | Fitzgerald et al. | ................. | 713/1 |
| 6,662,357 B1 | 12/2003 | Bowman-Amuah | | |
| 6,957,237 B1 * | 10/2005 | Traversat et al. | ..................... | 1/1 |
| 7,165,107 B2 * | 1/2007 | Pouyoul et al. | ............... | 709/225 |
| 2002/0091809 A1 * | 7/2002 | Menzies et al. | ............... | 709/223 |
| 2002/0144009 A1 | 10/2002 | Cheng et al. | | |
| 2003/0017477 A1 | 1/2003 | Vind | | |
| 2003/0055862 A1 * | 3/2003 | Bhat | ............................ | 709/101 |

(Continued)

FOREIGN PATENT DOCUMENTS

EP 001061441 A2 12/2000

(Continued)

OTHER PUBLICATIONS

Robkov, S, Hulegaard, S: "using Embedded Platform Management with WBEM/CIM".

(Continued)

*Primary Examiner* — Charles Rones
*Assistant Examiner* — Daniel Kuddus
(74) *Attorney, Agent, or Firm* — Michael J. Buchenhorner; Vazken Alexanian

(57) ABSTRACT

Methods, and systems for migrating personality of a computing environment from a source machine platform to a target machine platform through a CIM-based system management infrastructure. A system includes: database wherein migration rules of CIM objects between a plurality of platforms are recorded; and migration tool for implementing migration according to the migration rules in the database, which includes: migration rule extractor, CIM object extractor, migration task producer and migration task executor. The extractor extracts CIM objects related to personality of the computing environment from source machine platform according to migration rule extracted from the database by rule extractor, and extracts from the target machine platform objects corresponding to the extracted CIM objects of the source machine platform. The migration task producer generates the migration tasks according to extracted migration rules. The migration task executor executes generated migration tasks on the CIM objects of the target platform.

11 Claims, 7 Drawing Sheets

U.S. PATENT DOCUMENTS

| | | |
|---|---|---|
| 2003/0067485 A1* | 4/2003 | Wong et al. ............... 345/747 |
| 2003/0070061 A1 | 4/2003 | Wong |
| 2003/0115197 A1 | 6/2003 | Horan et al. |
| 2003/0126124 A1 | 7/2003 | Hegde et al. |
| 2003/0135648 A1 | 7/2003 | Porter |
| 2003/0159028 A1* | 8/2003 | Mackin et al. ............ 713/100 |
| 2003/0217195 A1 | 11/2003 | Mandal et al. |
| 2004/0055004 A1* | 3/2004 | Sun et al. ................. 718/108 |

FOREIGN PATENT DOCUMENTS

FR 002816429 A1 5/2002

OTHER PUBLICATIONS

Doss document RSW920000130US1 Leah et al; Object Model and Framework for Installation of Software Packages using Object Descriptors.

* cited by examiner (1) Migration request processor   (4) migration task producer
(2) Migration rule extractor      (5) migration subtask queue
(3) CIM object extractor

MIGRATING PERSONALITY OF COMPUTING ENVIRONMENT FROM SOURCE PLATFORM TO TARGET PLATFORM

FIELD OF THE INVENTION

The present invention generally relates to a method and system for migrating personality of a computing environment from a source machine platform to a target machine platform. It is more particularly related to a method and system for migrating personality of a computing environment from a source machine platform to a target machine platform through a Common Information Model-based [herein also referred to as CIM-based] system management infrastructure. The phrase 'Common Information Model' is herein also referred to as 'CIM'.

BACKGROUND

Generally a computing environment includes a device or a set of devices with software/firmware (OS, applications, etc.) to provide a set of computing services to end-users. The personality of computing environment means the hardware/firmware/software changes directly or indirectly made by end-users during the use of computing environment. Through reapplying those changes, the end-user can rejuvenate his/her working status of the computing environment at a certain time. How to preserve personality of a computing environment during computer migration is a non-trivial process. A commercial operating system vendor (such as Microsoft Corporation) will want it to be extremely difficult, if not impossible, to migrate one computing environment (a Windows 2000™-based computing environment) to the computing environment of another vendor (such as a Linux™ based computing environment). Such migration is also hard even if the computers involved are running the exact same version of the same operating system. For example, if imaging (or disk cloning) is not an option, it is an arduous task to migrate from one computing environment of Windows™ to another.

The inordinate difficulty can be ascribed to the fact that definition and extractability of a system's personality have hardly ever been points of focus during system design. Besides, the lack of cross-platform personality representation exacerbates the portability of computing environment. Finally, the user's unfamiliarity to the application on target platform is another negative impact to user's motivation on migration.

U.S. patent applications U.S. 2003/0067485 A1, U.S. 2003/0070061 A1 and U.S. 2003/0135648 A1 can be referred as prior art reference documents related to system migration.

Due to the complexity of migration, there're some tools developed to help the migration task, among which there are some tools for PC migration purpose. The tools can transfer and transform the personality on one PC (source) to the other (destination) to help users to rejuvenate his/her working status on the destination PC, which has different OS and application set installed. But, all of the tools only support the migration between two PCs running Windows™ family OS (Windows 95™, Windows 98™, Windows Me™, Windows 2000™ or Windows XP™), such as, Aloha Bob PC Relocator™, Desktop DNA™, SMA™, IntelliMover™ PCSynC™, PT PRO™, Altiris PC Transplant™. The tools, especially their information probing and information representation method are designed for Windows™ and do not support cross-platform migration, because there are different concepts on different platforms and even the same concept will be represented in different forms on different platforms. For example, the concept of "drive X" in Windows™ filesystem does not exist on Unix™ filesystem. If your really want to express the "drive X" concept on Unix™ (has the same meaning), it will be like "disk drive with the device name of /dev/hdxN mounted on directory X".

It can be seen that current tools are designed for specific two platforms (most are approximate platforms running the operating systems and applications belonging to a same series) and most only support one-way migration (e.g., support the migration from Windows95 to Windows2000 and do not support the backward migration). In addition, there are not any tools to help a user to get familiar with a new application on the basis of the user's experience and concept formed on an existing application on a platform, e.g. user migrates from MS Word™ to OpenOffice Writer™, where the new application has the functions similar to those of the existing application and is on another platform.

Therefore, there is needed a brand new migration system and method independent of special platform and not limited to only supporting one-way migration. Also needed is a mechanism for helping a user, by using his/her concept and experience formed on an existing application on one platform, to get familiar with a new application on another platform that has similar functions with those of the existing application.

SUMMARY OF THE INVENTION

Thus, in view of the above, a general aspect of the present invention is to provide migration systems, apparatus and methods for migrating a computing environment between any two different or identical platforms without losing its personality. The invention provides a new architecture relying upon the CIM(Common Information Model)-based system management infrastructure, which enable cross-platform computing environment migration, is proposed. The present invention also provides a new mechanism, double-face UI navigator, to online help user to get familiar with new application through establishing a bridge between the knowledge of a user experienced application and that of the new application.

According to one aspect of the present invention, there is provided a method for migrating personality of a computing environment from a source machine platform to a target machine platform, said source machine platform and said target machine platform both having CIM objects extracted on a CIM-based system management infrastructure. An example of a method includes the steps of: providing in a database migration rules of CIM objects between a plurality of platforms; extracting from the database the migration rule of CIM objects between said source machine platform and said target machine platform; extracting CIM objects related to said personality of the computing environment from said source machine platform according to the extracted migration rules; extracting from the target machine platform CIM objects corresponding to the extracted CIM objects of the source machine platform according to the extracted migration rules; generating migration tasks to be executed on the extracted CIM objects of the target machine platform according to the extracted migration rules; and executing the generated migration tasks on the extracted CIM objects of the target machine platform.

According to another aspect of the present invention, there is provided a system for migrating personality of a computing environment from a source machine platform to a target machine platform.

BRIEF DESCRIPTION OF THE DRAWINGS

These and other aspects and features of the present invention will become clear from the following description taken in conjunction with the accompanying drawings, in which.

DETAILED DESCRIPTION OF THE PREFERRED EMBODIMENTS

Figure 1:
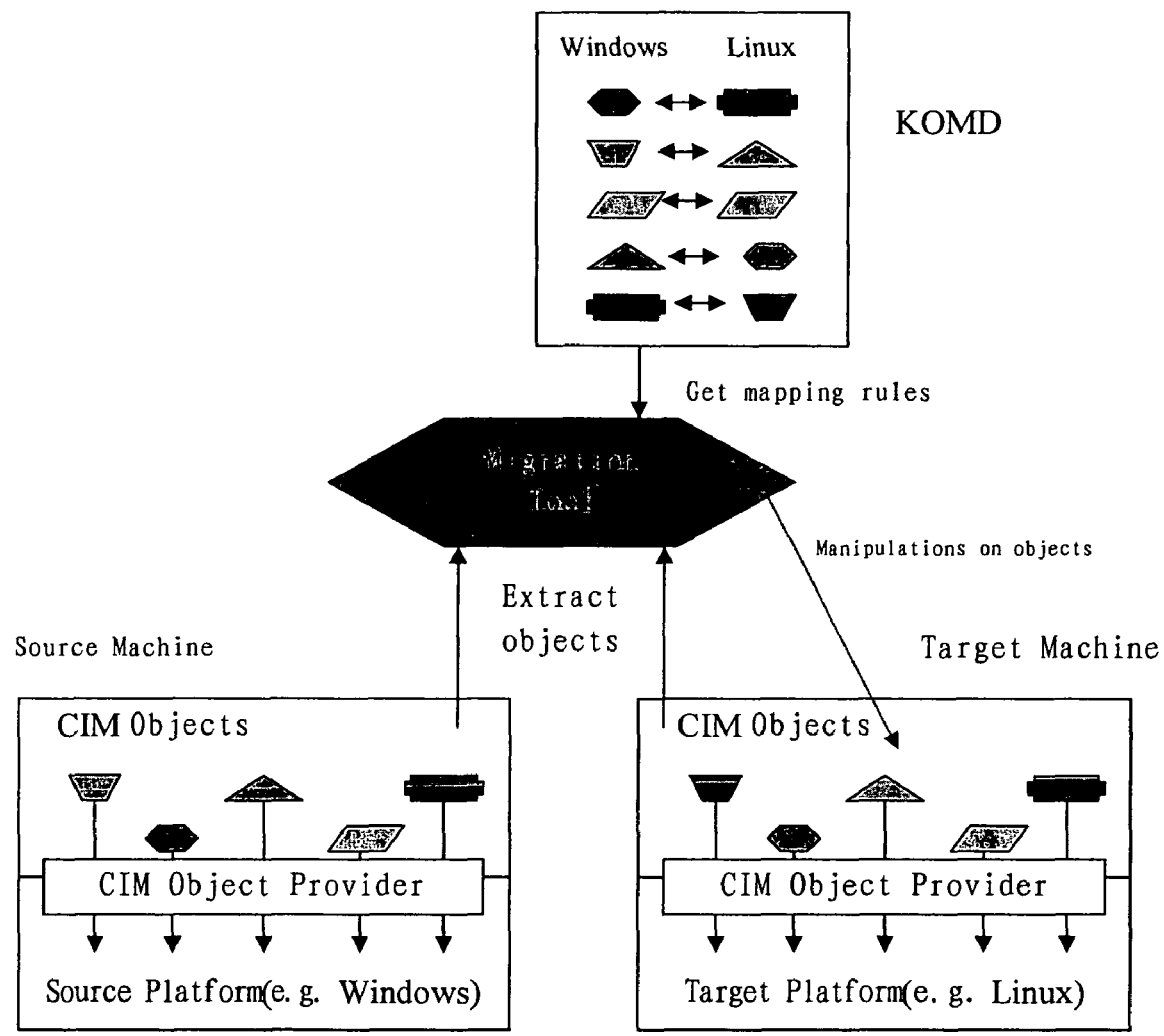
FIG. 1 shows an example of migrating personality of a computing environment from a source machine platform to a target machine platform and the basic operation process thereof according to an embodiment of the present invention.

The present invention provides migration systems, apparatus and methods for migrating a computing environment between any two different or identical platforms without losing its personality. In this invention, a new architecture relies upon the CIM (Common Information Model)-based system management infrastructure, which enable cross-platform computing environment migration, is proposed. The CIM standard is a newly proposed standard for modeling all elements in an enterprise computing environment. CIM is a conceptual information model for describing management that is not bound to a particular implementation. The standard allows for the exchange of management information between management systems and applications. This kind of information exchange can be either "agent to manager" or "manager to manager" communications that provides for distributed system management. There are two parts to CIM: the CIM specification and the CIM schema.

The present invention also provides a new mechanism, double-face UI navigator, to online help user to get familiar with new application through establishing a bridge between the knowledge of a user experienced application and that of the new application.

According to the present invention, there is provided a method for migrating personality of a computing environment from a source machine platform to a target machine platform, the source machine platform and the target machine platform both having CIM objects extracted on a CIM-based system management infrastructure. An example method includes the steps of: providing in a database migration rules of CIM objects between a plurality of platforms; extracting from the database the migration rule of CIM objects between said source machine platform and said target machine platform; extracting CIM objects related to said personality of the computing environment from said source machine platform according to the extracted migration rules; extracting from the target machine platform CIM objects corresponding to the extracted CIM objects of the source machine platform according to the extracted migration rules; generating migration tasks to be executed on the extracted CIM objects of the target machine platform according to the extracted migration rules; and executing the generated migration tasks on the extracted CIM objects of the target machine platform.

There is also provided a system for migrating personality of a computing environment from a source machine platform to a target machine platform, the source machine platform and the target machine platform both having CIM objects extracted on a CIM-based system management infrastructure, the system comprising: a database for recording migration rules of CIM objects between a plurality of platforms; a migration rule extracting means for extracting from the database the migration rules of CIM objects between the source machine platform and the target machine platform; a CIM object extracting means for extracting CIM objects related to the personality of the computing environment from the source machine platform according to the migration rules extracted by the migration rule extracting means, and for extracting from the target machine platform CIM objects corresponding to the extracted CIM objects of the source machine platform according to the extracted migration rules; a migration task producing means for generating the migration tasks to be executed on the extracted CIM objects of the target machine platform according to the extracted migration rules; and a migration task executing means for executing the generated migration task by the migration task producing means on the extracted CIM objects of the target machine platform. Therefore, according to the migration system and method provided by the present invention, the migration of personality of a computing environment can be performed between two machine platforms of any type, and a two-way migration is supported.

Advantageous embodiments of the present invention will be described hereinafter with reference to the drawings. FIG. 1 shows an example of migrating the personality of a computing environment from a source machine platform to a target machine platform and the basic operation process thereof according to an embodiment of the present invention. In the present invention, it should be understood that the migration of personality of a computing environment from a source machine platform (hereinafter referred to as "source platform") to a target machine platform (hereinafter referred to as "target platform") is performed on a CIM-based system management infrastructure. As shown in FIG. 1, in the example, the source platform is e.g. a Windows™-based system and the target platform is e.g. a Linux™-based system. But the types of the operation systems of the source machine and the target machine are not limited to those, and can be any other types of operation system, such as Solaris™, MacOS™, Palm™ etc. Furthermore, the source machine and the target machine according to the present invention are not limited to computers, but can be any other equipment having a certain computing ability, such as PDA, notepad, mobile phone etc. Also in the example, on the CIM-based system management infrastructure, the respective CIM objects of the source platform and the target platform are abstracted by the CIM object provider therein.

In order to transfer the personality of the computing environment from the source machine to the target machine, the migration system will perform a set of operations on the CIM objects from the target machine according to the personality included in the CIM objects from the source machine. As it can be learnt from CIM standard, different platforms share the object types defined in CIM common schema and differentiate at the object types defined in platform-specific CIM extension schema. Thus CIM object mapping rules (sometimes referred to as "migration rules" below) are needed to direct the operations.

These CIM object mapping rules are usually made by experienced experts according to their experiences, and are recorded in a database. So the database is also referred to as a Knowledge-based Object Mapping Database, briefly called KOMD hereinafter, which is actually a set of CIM object mapping rules organized in a special data format. In the KOMD of the present invention, the mapping rules of the CIM objects between a plurality of source platforms and target platforms of a plurality of types, not limiting to special platforms, are recorded. And the KOMD can be located anywhere accessible by the migration tool, such as on the source platform, the target platform, or a server other than the source platform and the target platform. That is to say, as shown in FIG. 1, the migration rules of CIM objects between a plurality of platforms are provided in the KOMD, such as the migration rules of CIM objects between Windows™ and Linux™

First, user issues a migration request to the migration tool. In the request message, the involved source and target machines are specified, i.e., the above-mentioned Windows™-based source machine and the Linux™-based target machine. When the request arrives, the migration tool locates from the KOMD the collection of the migration rules corresponding to the types of the source and target platform, i.e. the collection of the migration rules between Windows™ and Linux™, and extracts the migration rules. Then the migration tool extracts the CIM objects related to the personality of the computing environment from the source machine through the CIM-based system management infrastructure according to these migration rules. Then directed by the migration rules, the migration tool extracts corresponding CIM objects from the target machine through the CIM-based system management infrastructure, generates the migration tasks to be executed on the target CIM objects according to the migration rules, and executes these migration tasks on the target CIM object. When all the migration tasks have been executed, it means the migration has been accomplished.

In the above workflows, the migration tool is equivalent to the migration rule extractor, the CIM object extractor, the migration task producer and the migration task executor as described in the portion of summary of the invention. The migration tool interacts with the user and performs migrations through operations on CIM objects. Those operations are directed by the migration rules in the database.

Figure 2:
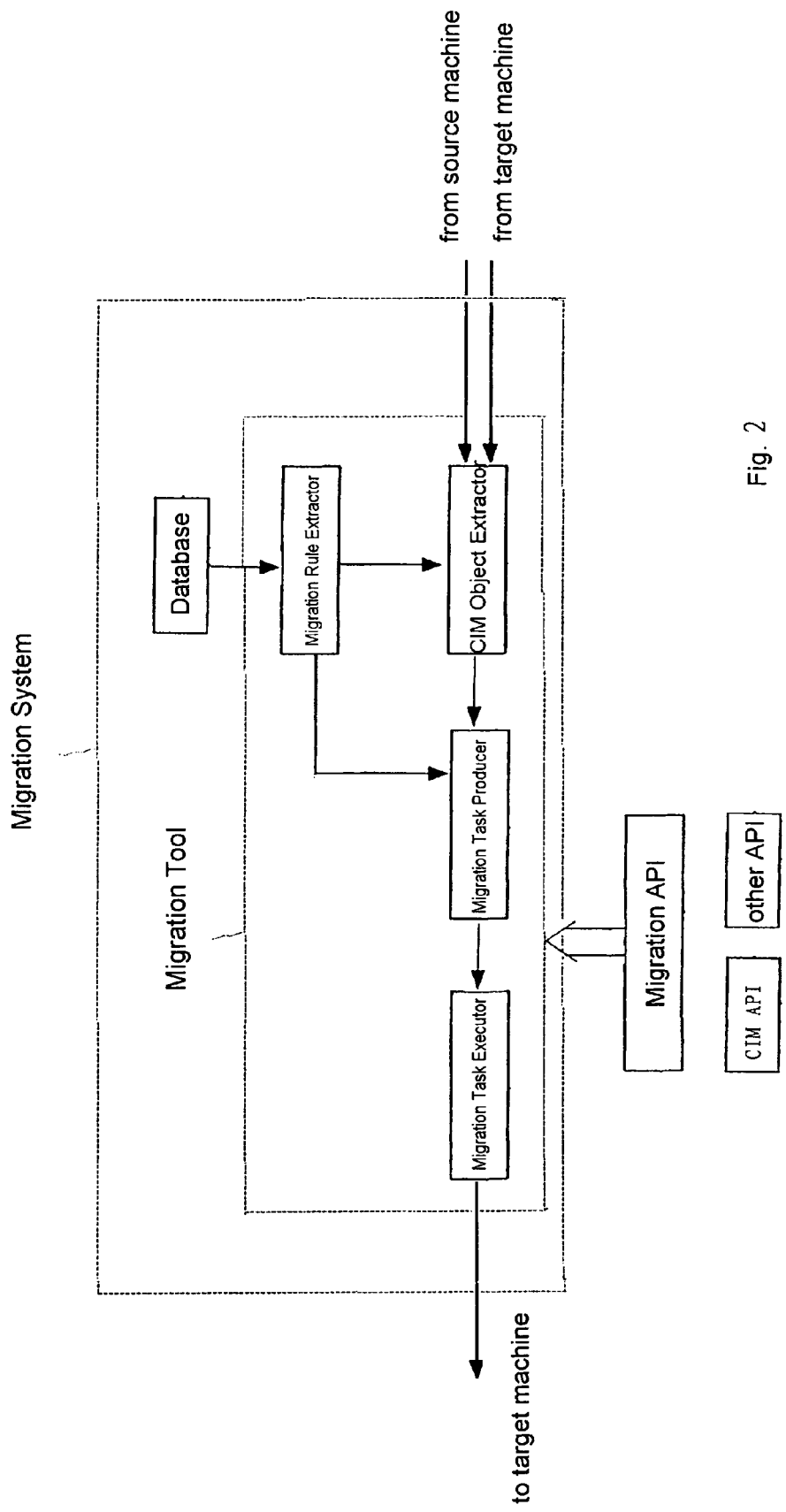
FIG. 2 is a block diagram showing the basic components of the system for migrating the personality of a computing environment from a source machine platform to a target machine platform according to an embodiment of the present invention.

FIG. 2 is a block diagram showing the basic components of the system for migrating personality of the computing environment from a source machine platform to a target machine platform according to an embodiment of the present invention. The migration system comprises: a database in which CIM object migration rules between a plurality of platforms are recorded; and a migration tool for implementing the migration according to the migration rules in the database, which further comprises 4 basic modules, i.e. a migration rule extractor, a CIM object extractor, a migration task producer and a migration task executor.

The migration tool works on the infrastructure of CIM management architecture. It acts like a management application defined in WBEM (Web Based Enterprise Management), which is a standard CIM management architecture. And http://www.dmtf.org/standards/wbem can be referred to for its detailed description. What the migration tool can see is a set of CIM objects representing the personality (except the user data) on specific machines, i.e., source and target. The migration tool is implemented based on migration API (Application Programming Interface), and the migration API is an abstract layer of CIM API and other APIs for migration purpose. It should be noted that the migration tool works on the CIM-based management infrastructure. Through standard CIM API, the migration tool performs operations on those CIM objects directed by the migration logic using the migration rules in the KOMD. As shown in FIG. 2, 4 basic modules in the migration tool operate as follows, respectively. In response to the migration request from a user, the migration rule extractor locates from the KOMD the migration rule set corresponding to the types of the source platform and the target platform, and gets the migration rules from it. According to these migration rules, the CIM object extractor extracts from the source machine the CIM objects related to the personality of the computing environment through the CIM-based system management infrastructure. Next directed by the migration rules, the CIM object extractor acquires from the target machine the CIM objects corresponding to those extracted from the source platform through the CIM-based management system infrastructure. The migration task producer generates the migration tasks to be executed on the extracted CIM objects on the side of the target platform according to the migration rules. The migration task executor is responsible for executing these migration tasks.

While the cases of using 4 basic modules to implement the migration tool are described in the above, the present invention is not limited to this. When implementing the migration tool, the above modules can be combined or divided into more detailed modules, or further include other additional modules for implementing the migration functions as described below, as long as these modules, when combined together, can implement the functions of the migration tool described in the portion of the summary of the invention.

Figure 3:
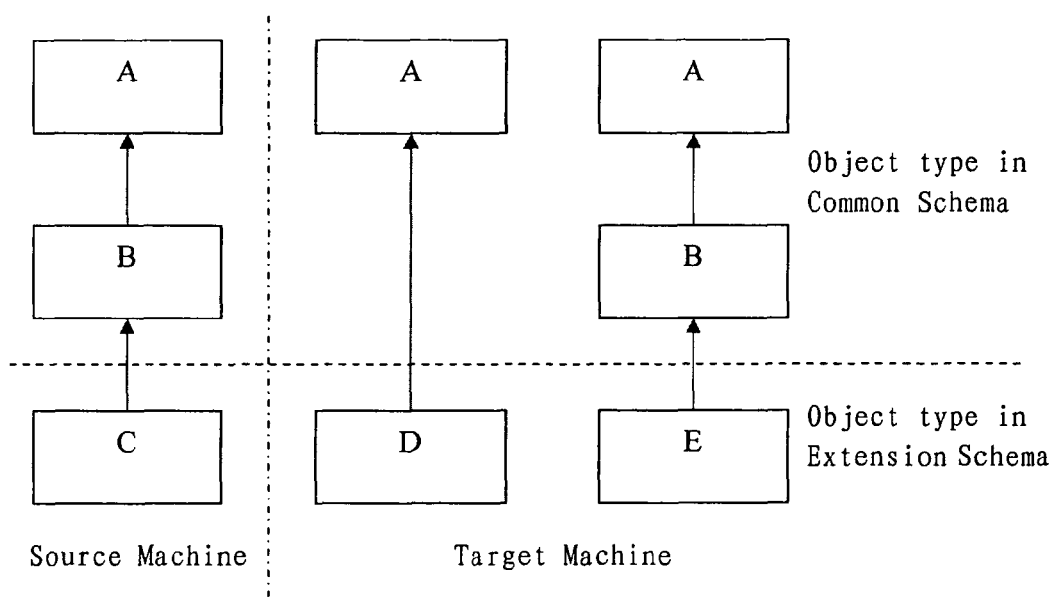
FIG. 3 is a schematic diagram of the inheritance relationship of the CIM object types according to an embodiment of the present invention.
Figure 4:
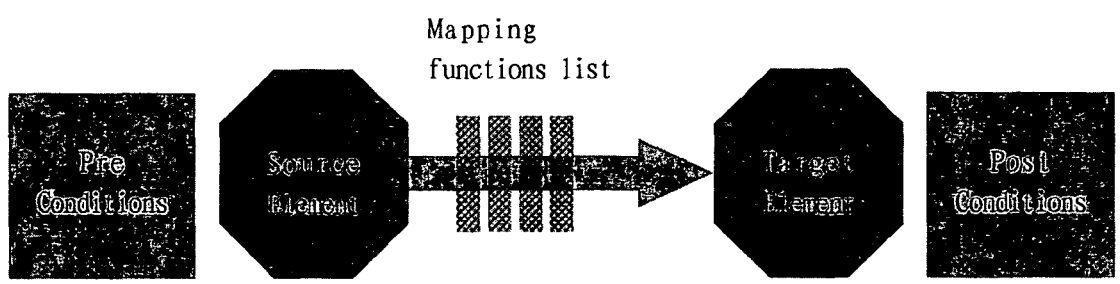
FIG. 4 is a schematic diagram illustrating the composition of a mapping path according to an embodiment of the present invention.

The mapping mechanism will be described in detail below with reference to FIGS. 3 and 4. As shown in the schematic diagram of the inheritance relations of the CIM object types in FIG. 3, the source machine and the target machine shares object type A and B defined in the CIM common schema, and their object types defined in the CIM extension schema are respectively: CIM object type C in the source machine, and CIM object type D and E in the target machine. When the counterpart on the target machine of the CIM object C on the source machine as shown in FIG. 3 is E, all C's properties and methods will be mapped to E's except the content in B, which they both inherit. When the counterpart of C on the target machine is D, all the properties and methods in B and C will be mapped to D's except the content in A, which they both inherit. The mapping rules include mapping paths. As shown in FIG. 4, each mapping path comprises a pair of source and target elements. The element can be object type, property or method. A series of functions (also referred to as "a mapping function list") exist in the each mapping path and a pair of pre/post conditions will be checked for each mapping path.

The checking of the mapping function list and the pre/post conditions determines the migration tasks to be executed on the target CIM objects.

Figure 5:
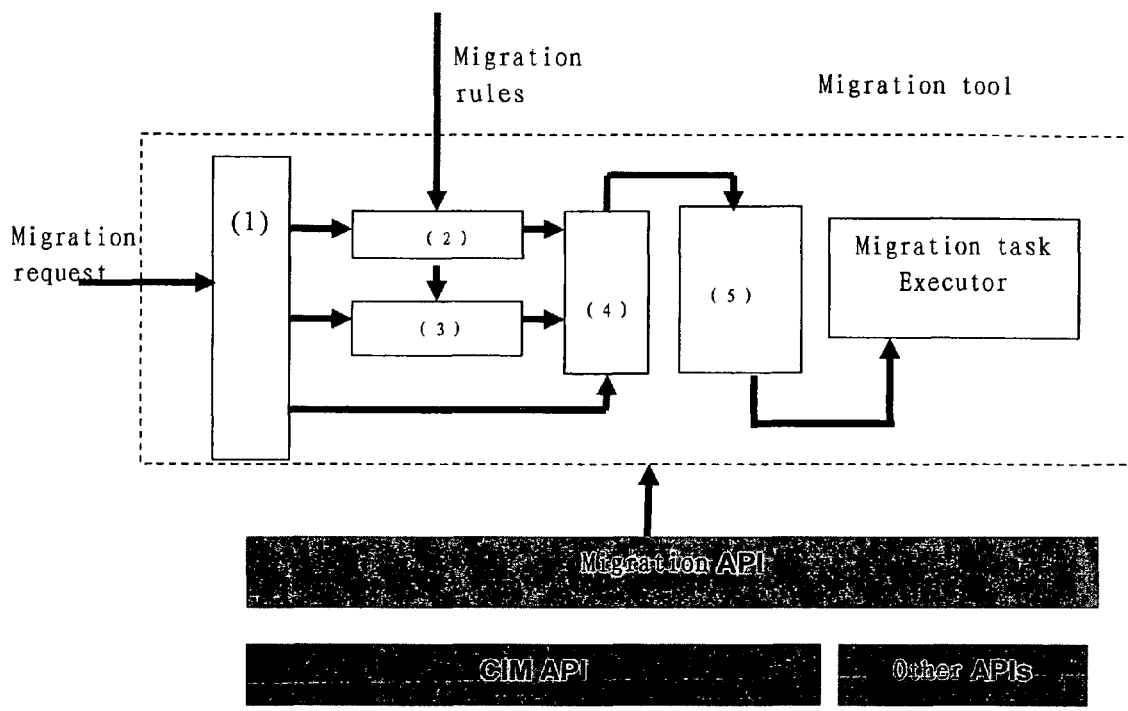
FIG. 5 is a block diagram illustrating the composition of a migration tool implemented according to another embodiment of the present invention.

FIG. 5 is a block diagram illustrating the composition of a migration tool implemented according to another embodiment of the present invention. As compared with the migration tool shown in FIG. 2, in addition to such 4 modules as the migration rule extractor, the CIM object extractor, the migration task producer and the migration task executor (they have been described above with reference to FIG. 2, and the description of their basic functions will be omitted in this embodiment), the migration tool in FIG. 5 additionally includes two modules: a migration request processor for dealing with the migration request of a user, and a migration subtask queue for storing the migration subtasks generated by the migration task producer.

It should be noted that, the migration tool according to the present invention works based on the CIM-based system management infrastructure. In the present embodiment, when a user issues a migration request where the source machine and the target machine for performing migration are specified, the migration request processor will process the request. The migration request processor will authenticate access authority of the requesting party to the specified source and target machine in the subsequent migration activities. After authentication succeeds, the migration request processor feeds the migration rule extractor, the CIM object extractor and the migration task producer with the access entry addresses of the source and target machines, respectively, so as to use the entry addresses to perform operations on the CIM objects of the source and target machines. And during the operation of the CIM object extractor, The CIM object extractor first queries the types of CIM objects related to the personality of the computing environment on the side of source machine. Those types are source machine platform independent (described in the core or common schema in CIM) or specific to the platform of the source machine (described in extension schema in CIM). Then the CIM object extractor extracts the type-matched CIM objects from the source machine according to these types through CIM-based system management infrastructure.

When the migration task producer generates migration tasks to be enqueued into the migration subtask queue, the migration task producer will first resolve the dependency among the mapping paths in the migration rules obtained from KOMD by the migration rule extractor, and then the CIM object extractor further extracts the CIM objects from the source platform and the target platform according to the resolved dependency until there is no further dependency. Finally, according to the dependency between the mapping paths (e.g. disk space on target machine should be ensured before user data migration, etc.) the migration task producer generates the migration subtasks and enqueues these subtasks into the migration subtask queue in accordance with the dependency. In most cases, subtask is a set of CIM operations and goes through CIM API. The migration subtask queue keeps all migration subtasks in a sequence in accordance with the above-mentioned dependence so as to provide these subtasks to the migration task executor without breaking the dependence rules between these subtasks. When all the migration subtasks are enqueued into the migration subtask queue, the migration task producer inserts an end symbol. Accordingly, the migration task executor gets subtasks one by one from the migration subtask queue and executes them through migration API until the end symbol is reached, which means the migration has been accomplished.

Figure 6:
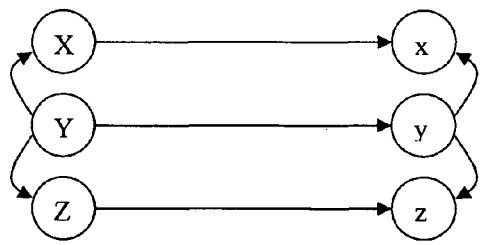
FIG. 6 is a schematic diagram illustrating the checking of the dependency relationships between the mapping paths according to an embodiment of the present invention.

The dependency check between the mapping paths according to an embodiment of the present invention will be described below with reference to FIG. 6. When migration task producer generates subtasks in sequence to feed the migration subtask queue, it will check and resolve the dependency among the mapping paths related to each subtask and input the subtask into the migration subtask queue without breaking the dependency rule. For example, as shown in FIG. 6, X, Y, and Z are the objects on a source platform, where X is the object representing a virtual device driver for VPN network connecting. Z is the object representing the driver files. And Y is the object representing the dependency relationship of X and Z (X depends on Z). The arrows shown in FIG. 6 represent the references of object Y The reference tells us which object is involved in the dependency relationship. x, y, z are the corresponding objects on the target platform. So, we got three subtasks shown as the follows: X→x, Y→y, Z→z. When the migration task producer produces subtask X→x, it will find X→x has dependency Y→y and then further find the Z→z. The migration task producer will input Z→z into the subtask queue firstly, X→x secondly and Y→y lastly.

Figure 7:
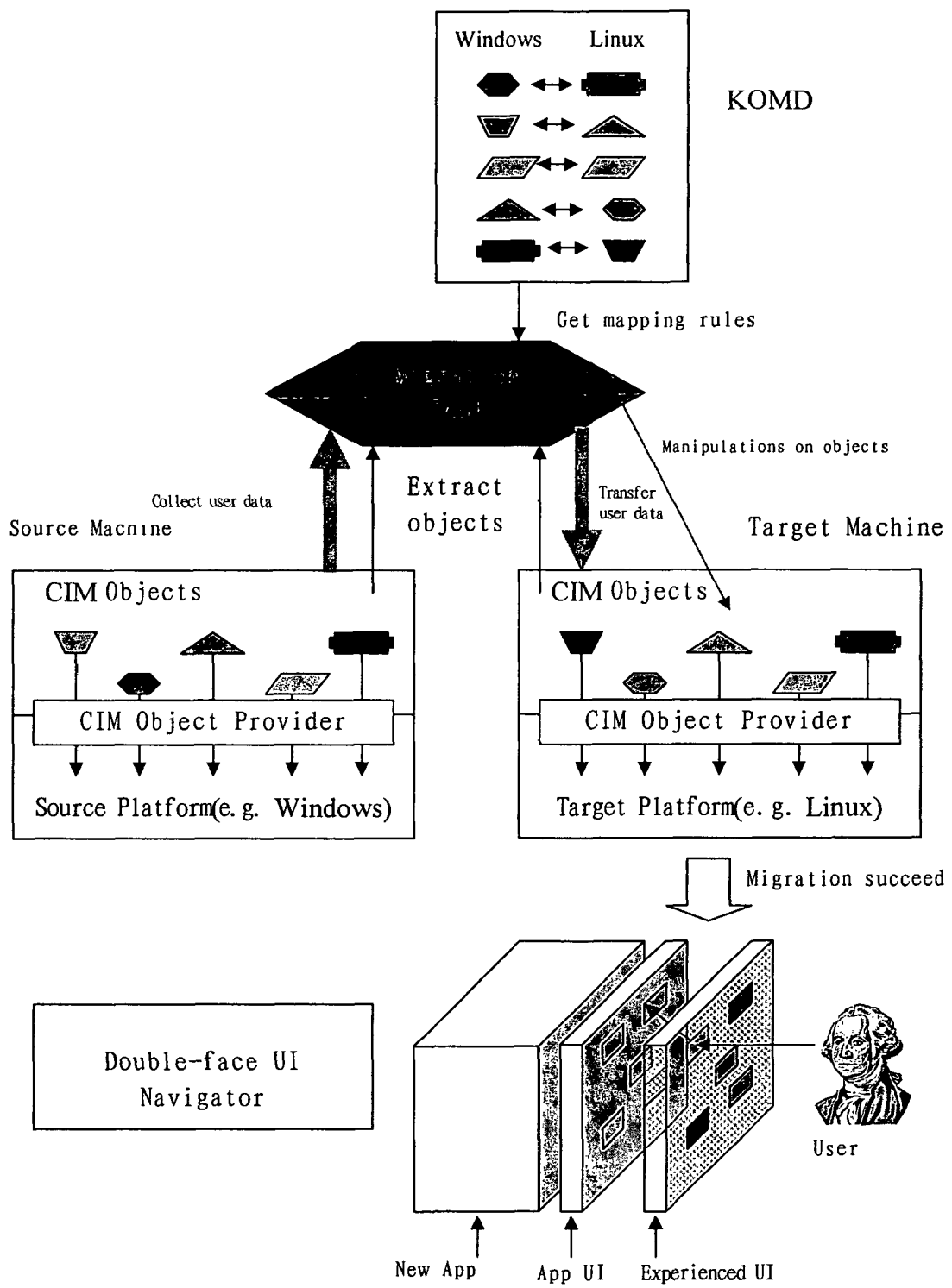
FIG. 7 shows an example of migrating personality of a computing environment from a source machine platform to a target machine platform and the operation process thereof according to another embodiment of the present invention.

FIG. 7 shows an example of migrating personality of the computing environment from a source machine platform to a target machine platform and the operation process thereof according to another embodiment of the present invention, of which the basic components of the migration system and the functions thereof are identical to those in FIG. 1. So, the identical components and the functions thereof having been described with respect to FIG. 1 will not be described any more here. The difference between the examples in FIG. 7 and FIG. 1 lies in that: the migration tool in FIG. 7 further comprises a double-face UI navigator which online helps user to get familiar with a new application through establishing a bridge between the knowledge of a user experienced application and that of the new application.

Aiming at helping migration of user experience on individual application, the double-face UI navigator provides a new online help mechanism to smooth the migration work. It is assumed that: 1. Users are very familiar with the usage of applications on the source machine, but have no idea about the applications on the target machine. 2. Pair of applications, one from the source machine and the other from the target machine, have similar functions, e.g., MS Word™ and OpenOffice Writer™. The major obstacle for a MS Word™ user migrating to OpenOffice Writer™ is the different UI. Here, MS Word™ and OpenOffice Writer™ are only illustrative, and such a pair of applications on the source machine and the target machine according to the present invention can be any other pair of applications with similar functions.

When an application, assumed to be X, on the target machine is invoked (assuming that the counterpart of X on the source machine is Y and the user is familiar with Y), the double-face UI navigator provides a translucent UI covering the application X's UI according to the UI description of the application Y The translucent UI is the same as the UI of the corresponding application Y which the user is familiar with. Through the translucent UI, the user can use X according to his/her knowledge about Y and learn how to use X during the Y-style usage.

Figure 8:
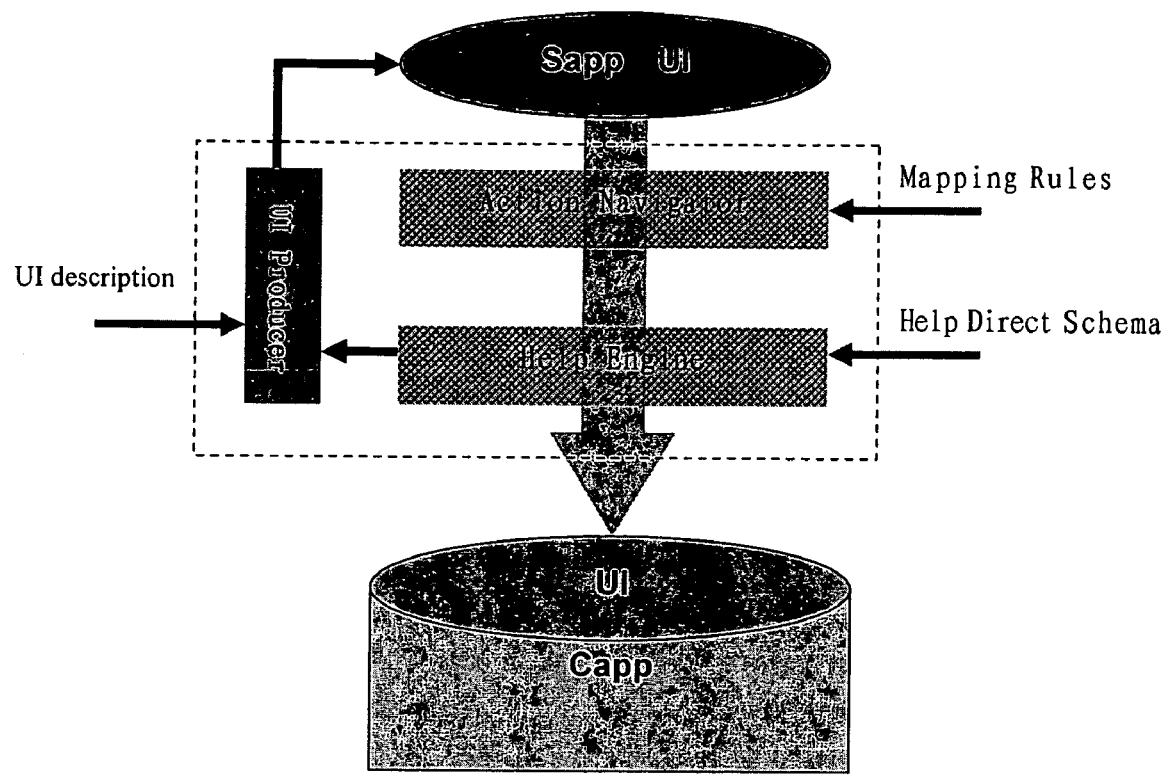
FIG. 8 shows the composition of the double-face UI navigator shown in FIG. 7 and the working process thereof.

The composition of the double-face UI navigator and the working process thereof can be described with reference to FIG. 8. Referring to FIG. 8, the application labeled as Sapp is the application on the source machine, and the application labeled as Capp is the counterpart application of Sapp on the target machine. It is assumed that the user is very familiar with the usage of application Sapp, but is not familiar with application Capp on the target machine.

The double-face UI navigator comprises a UI producer, an action navigator and a help engine. The UI producer is for building up a translucent UI, which overlaps with the UI of Capp on the target machine according to the description about the Sapp's UI. The action navigator is for controlling the process of navigating the corresponding events triggered by the translucent UI to the Capp's UI and performing the navigator action generated. The help engine is for producing a runtime UI description, and then feeding the UI producer to change Sapp's translucent UI dynamically.

When the application Capp on the target machine is activated, the UI producer reads a UI description from the KOMD. The UI description in a special format (e.g. UIML) describes the UI of Sapp. According to the description, the UI producer builds up a translucent UI, which overlaps with the UI of Capp on the target machine. Thus the user will see a Capp's UI topped with a translucent UI of Sapp. The user will perform operation on the Sapp's translucent UI. Corresponding events triggered by the translucent UI will be navigated to the Capp's UI and produce correct corresponding actions. The navigation is under control of the action navigator. The action navigator performs the navigation behaviors, a kind of mapping, based on the migration rules described in the KOMD. In order to help user to learn the usage of the Capp, the help engine is interpolated into the navigation path. Through pre-coded help direct schema, the help engine can produce a runtime UI description, and then feed the UI producer to change Sapp's translucent UI dynamically. Through this mechanism, the double-face UI navigator can present help topics on the translucent UI related to the user operations and directed by the help direct schema.

Therefore, to sum up, through the double-face UI navigator, the user can use the new application with similar functions on the target machine according to his/her knowledge on the source machine application and learn how to use it.

In addition, in the example as shown in FIG. 7, the migration tool, after executing all the generated migration tasks, further collects from the source platform the user data specified in the user request, and transfers the collected user data to the target platform.

Figure 9:
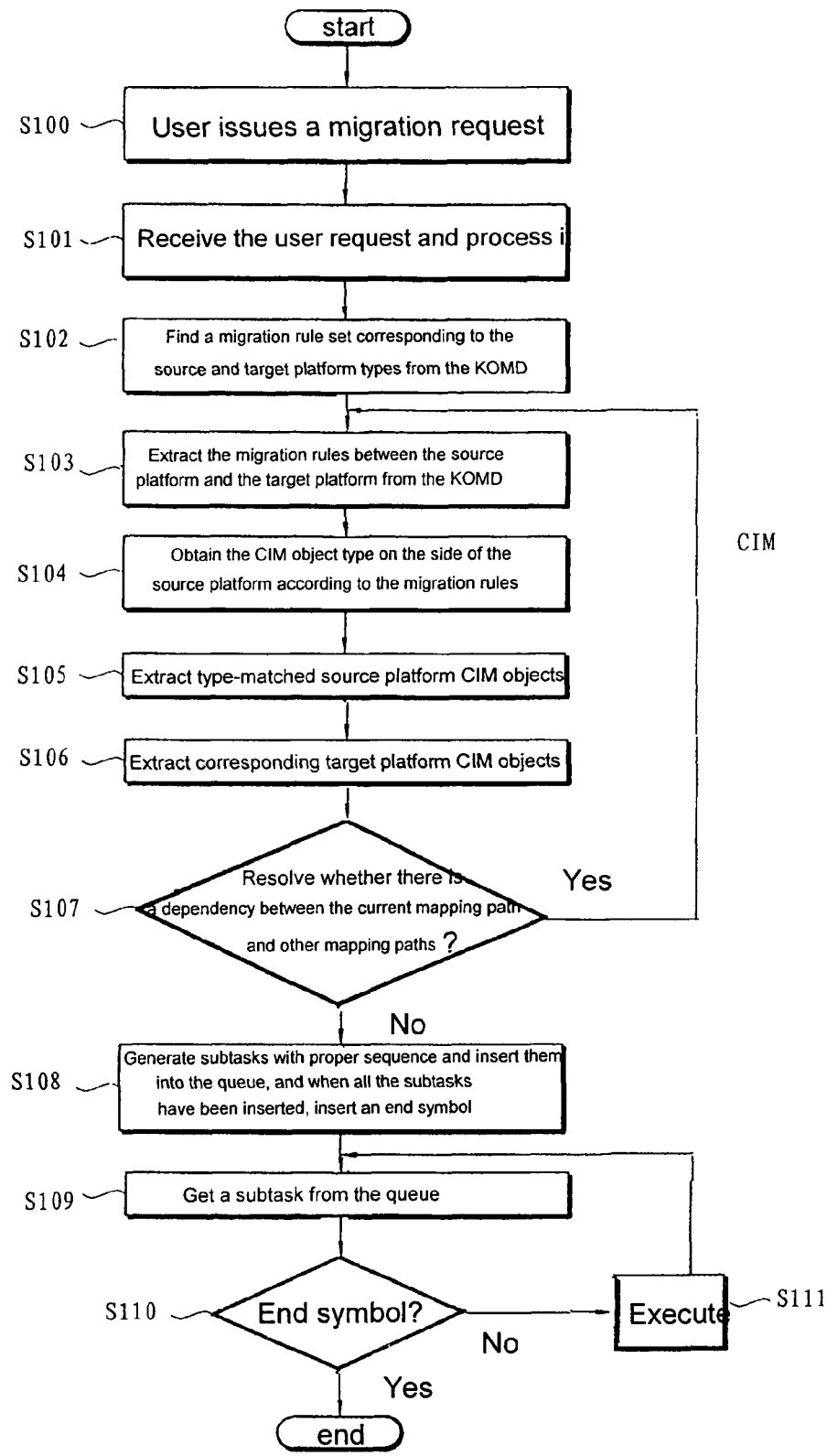
FIG. 9 is a flowchart illustrating a method for migrating personality of a computing environment from a source machine platform to a target machine platform according to an embodiment of the present invention.

FIG. 9 is a flowchart illustrating a method for migrating personality of the computing environment from a source machine platform to a target machine platform according to an embodiment of the present invention. As described above with reference to FIG. 1, before starting to migrate, CIM object migration rules between a plurality of platforms has been provided in the KOMD. Referring to FIG. 9, at step S100, the user issues a migration request in which the source and target platform type information is specified. At step S101, the migration request processor as shown in FIG. 5 gets the migration request of the user and processes it. It first authenticates the access authority of the user issuing the request. After the authentication is successful, the migration request processor provides the access entry addresses of the source and target platforms to the other modules in the migration tool so as to perform operations on the CIM objects of the source machine and the target machine by using those access entry addresses. Next, at step S102 the migration rule extractor as shown in FIG. 5 locates from the KOMD a migration rule set corresponding to source and target platform type, and gets the migration rule of the CIM objects between the source platform and the target platform from the KOMD at step S103.

At step S104, the CIM object extractor as shown in FIG. 5 acquires the CIM object type on the side of the source platform according to the CIM object migration rule obtained at the step S103, and at step S105 extracts the CIM object matching with the type from the source platform through the CIM-based system management infrastructure. Then at step S106, the CIM object extractor further extracts from the side of the target platform the CIM object corresponding to that on the side of the source platform extracted at step S105.

Next, at step S107, the migration task producer as shown in FIG. 5 checks and resolves whether there exists a dependency relationship between the mapping path included in the present migration rule and other mapping paths. If the resolving result is "yes", then the process returns to step S103 to further extract the related migration rule and the CIM objects on the source platform and the target platform, and thus further resolve whether there exists a dependency relationship between the mapping path included in the extracted migration rule and other mapping paths. If the resolving result at step S107 is "no", it implies there exists no dependency relationship between the present mapping path and other mapping paths, and then the process proceeds to step S108. At step S108, the migration task producer generates the subtasks having a proper sequence in accordance with the resolved dependency relationship and inserts them into the migration subtask queue as shown in FIG. 5. When all the subtasks have been inserted, an end symbol is inserted.

Then, at step S109, the migration task executor shown in FIG. 5 gets a subtask from the migration subtask queue and at step S110 determines if what is got is an end symbol. If it determines that what is got is an end symbol, it means that the migration ends. If it determines what is got is a subtask, then the process proceeds to the next step S111, where the migration task executor executes the subtask. Next the process returns to the step S109 to further get a subtask from the migration subtask queue and repeat the above-mentioned processes until what is got from the migration subtask queue is an end symbol.

The operation processes of a method for migrating personality of the computing environment from a source platform to a target platform according to an embodiment of the present invention has been described above in conjunction with FIGS. 9 and 5. But the method for migrating personality of a computing environment from a source platform to a target platform according to the present invention is not limited to this. For example, in another embodiment implementing the migration method according to the present invention, the method further comprises another step of transferring user data from the source platform to the target platform after the migration task executor has finished executing all the migration tasks generated by the migration task producer. As another example, in yet another embodiment implementing the migration method according to the present invention, a double-face UI navigation mechanism is introduced. That is, the migration processes further comprises the following step of: when a user invokes an application on a target platform (assuming the user is not familiar with the application), the double-face UI navigation mechanism generates a translucent UI on the UI of the application, according to the description for the UI of a corresponding application on a source platform (assuming the user is very familiar with the application) having similar functions as those of the application on the target platform, with the translucent UI being identical to the UI of the corresponding application on the source platform.

A specific example of migrating personality of the computing environment from a source platform to a target platform according to the present invention will be given below. There exists in the KOMD a set of mapping paths for Windows™ to Linux™ user migration. These paths are listed in the following Table 1:

TABLE 1

User related mapping paths

| Path No. | Source Object | Target Object |
|---|---|---|
| 1. | Win32_UserAccount.Name="%SrcCurrentLoginUserName%" | Linux_UserAccount.Name="%SrcCurrentLoginUserName%" |
| 2. | Win32_GroupAccount | Linux_GroupAccount |
| 3. | Win32_Domain | Linux_Domain |
| 4. | Win32_GroupUser.GroupComponent="%PathNo.2::1%", PartComponent="%PathNo.1%" | Linux_GroupUser.GroupComponent="%PathNo.2::1%", PartComponent="%PathNo.1%" |
| 5. | Win32_DomainUser.GroupComponent="%PathNo.3::1%, PartComponent="%PathNo.1%" | Linux_DomainUser.GroupComponent="%PathNo.3::1%", PartComponent="%PathNo.1%" |
| 6. | Win32_DomainGroup.GroupComponent="%PathNo.3::2%, PartComponent="%PathNo.2%" | Linux_DomainGroup.GroupComponent="%PathNo.3::2%, PartComponent="%PathNo.2%" |

Wherein GroupUser, DomainUser and DomainGroup represent the dependency between User, Group and Domain. The dependency direction is as follows:
   User depends on Group,
   User depends on Domain,
   Group depends on Domain.
When the KOMD is ready, the migration proceeds as follows:
   1. When a migration request is issued, the platform information of the source and target machine will be retrieved by the migration request processor. The migration request processor will turn the information into internal variables such as %SrcCurrentLoginUserName% which include the name string of current source machine login user. All of these variables will be sent to the migration processor as the migration preparation.
   2. With those initial information, the migration processor will first locate the set of paths corresponding to the platform types of source machine and target machine. Here, the set of paths in Table 1 will be used for Windows™ to Linux™ migration.
   3. The migration processor then reads the first path from the KOMD, the path No. 1 in Table 1 (hereinafter it is referred to as path 1, path No. 2 will be referred to as path 2 below, and the rest likewise). According to path 1, the migration processor will query the object, Win32_UserAccount.Name="%SrcCurrentLoginUserName%", from a Windows machine, and then look up the object, Linux_UserAccount.Name="%SrcCurrentLoginUserName%", from Linux machine. Here it is assumed that the Windows™ current login user does not exist on the Linux™ machine. So, the migration processor will obtain the 26 object from the Windows™ machine, but nothing from the Linux™ machine.
   4. Before the migration processor inserts path 1 into the migration subtask queue (here it should be explained that one path corresponds to a plurality of subtasks, and inserting in a path is equivalent to inserting the plurality of subtasks corresponding to the path, or to inserting the subtask when regarding the plurality of subtasks wholly as the subtask), the migration processor will consult the KOMD. It will find there are several dependent paths related to path 1 object. The paths representing dependency related to path 1 are path 4 and path 5. Therefore, the migration processor will skip to path 4.
   5. The migration processor will read path 4 from the KOMD. Having got the objects on path 1, the migration processor will get several sets of objects, Win32_GroupUser, Linux_GroupUser, Win32_GroupAccount and Linux_GroupAccount through querying the source and target machine respectively for Win32_GroupUser.Part Component="%PathNo. 1%" and Linux_GroupUser.Part Component="%PathNo. 1%" in path 4. Then the migration processor will find path 2 needs to be finished for those Win32_GroupAccount and Linux_GroupAccount objects before it can continue on path 4.
   6. The migration processor will process path 2 with the objects of Win32_GroupAccount and Linux_GroupAccount, which is got from querying in path 4. As it has been mentioned in the above step 4, the migration processor will consult the KOMD before inserting path 2 into the migration subtask queue. It will further find path 6 having a dependence relationship with path 2. Then the migration processor will go through the steps similar to step 4, 5 and finally go to path 3. The path 3::1(PathNo. 3::1) uses ::1 to differentiate the path 3 objects related to path 6 from path 3 objects related to path 5. Therefore the total sequence of path processing for table 1 is listed as follows: $P1 \rightarrow P4 \rightarrow P2 \rightarrow P6 \rightarrow P3::2 \rightarrow P3::2_{itq} \rightarrow P6_{itq} \rightarrow P2_{itq} \rightarrow P4_{itq} \rightarrow P1 \rightarrow P5 \rightarrow P3::1 \rightarrow P3::1_{itq} \rightarrow P5_{itq} \rightarrow P1_{itq}$, Wherein subscript itq means "insert into task queue".
   7. When the migration subtask queue is not empty, the migration task executor will get the path (subtask) from the migration subtask queue and invoke the mapping function list specified by the path. The functions in mapping function list will change some aspects of Linux™ machine. For example, the function in mapping function list creates user account on Linux™ with the username and password of Windows™'s current login user.
   8. When all paths in KOMD are processed by the migration processor and all subtasks in the migration subtask queue are executed by the migration task executor, the migration is accomplished.

In the above specific examples, it should be further indicated that the migration processor described here actually corresponds to the combination of the migration rule extractor, the CIM object extractor and the migration task producer described in the portion of the summary of the invention in the present specification.

While the present invention has been specifically shown and described with respect to the illustrative embodiment thereof, those ordinary skilled in the art should understand that various changes in form and detail can be performed on the present invention without departing the spirit and scope of the present invention defined by the accompanying claims.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A computer-implemented method comprising
migrating a personality of a computing environment from a source machine platform to a target machine platform, said source machine platform and said target machine platform both having Common Information Model objects extracted on a Common Information Model based system management infrastructure, the migrating step comprising steps of:
   a) providing in a database, migration rules of Common Information Model objects between a plurality of platforms;
   b) extracting from the database the migration rules of Common Information Model objects between said source machine platform and said target machine platform;
   c) extracting Common Information Model objects related to said personality of the computing environment from said source machine platform according to the extracted migration rules;
   d) extracting from the target machine, platform Common Information Model objects corresponding to the extracted Common Information Model objects of the source machine platform according to the extracted migration rules;
   e) generating migration tasks to be executed on the extracted Common Information Model objects of the target machine platform according to the extracted migration rules; and
   f) executing the generated migration tasks on the extracted Common Information Model objects of the target machine platform;
   g) issuing a migration request by a user, wherein the source machine platform and the target machine platform involved in the migration as well as the user data are specified in the migration request; and
   when an application on the target machine platform is invoked, h) generating a translucent UI (user interface) on the UI of the application, said translucent UI being identical to the double-face UI of the corresponding application on the source machine platform which has similar functions with those of the application on the target machine platform.

2. The method according to claim 1, wherein the migration rules include mapping paths which correspond to a pair of the Common Information Model object of the source machine platform and the Common Information Model object of the target machine platform, and step e further comprises the sub-steps of:
   e1) resolving the dependency between the mapping paths, and repeating steps b-d according to the resolved dependency until there is no further dependency;
   e2) generating the migration subtask queue in the sequence consistent with the dependency; and
   e3) inserting an end symbol after all the migration subtask queues are generated according to all the Common Information Model object migration rules obtained at step b.

3. The method according to claim 2, wherein the step f further comprises the sub-steps of:
   f1) acquiring a migration subtask from the migration subtask queue;
   f2) executing the migration subtask; and
   f3) repeating steps f1 and f2 until reaching said end symbol.

4. The method according to claim 1, wherein said step c further comprises the sub-steps of:

c1) acquiring the source machine platform Common Information Model object type related to said personality of the computing environment according to the extracted migration rules; and c2) extracting the Common Information Model object matching with the acquired type from said source machine platform.

5. The method according to claim 1, further comprising the step of sending the user data from said source machine platform to said target machine platform.

6. A machine system for migrating personality of a computing environment from a source machine platform to a target machine platform, said source machine platform and said target machine platform both having Common Information Model objects extracted on a Common Information Model-based system management infrastructure, the machine system comprising:

a database recording migration rules of Common Information Model objects between a plurality of platforms;

a migration rule extracting means for extracting from the database the migration rules of Common Information Model objects between said source machine platform and said target machine platform;

a Common Information Model object extracting means for extracting Common Information Model objects related to said personality of the computing environment from said source machine platform according to the migration rules extracted by the migration rule extracting means, and for extracting from the target machine platform Common Information Model objects corresponding to the extracted Common Information Model objects of the source machine platform according to the extracted migration rules;

a migration task producing means for generating the migration tasks to be executed on the extracted Common Information Model objects of the target machine platform according to the extracted migration rules;

a migration task executing means for executing the generated migration task by the migration task producing means on the extracted Common Information Model objects of the target machine platform;

a storage device comprising an instruction causing a processor to issue a migration request by a user, wherein the source machine platform and the target machine platform involved in the migration as well as the user data are specified in the migration request; and a double-face UI (user interface) navigating means for, when an application on the target machine platform is invoked, generating a translucent UI on the UI of the application, said translucent UI being identical to the UI of the corresponding application on the source machine platform which has similar functions with those of the application on the target machine platform.

7. The system according to claim 6, wherein the migration rules include mapping paths which correspond to a pair of the Common Information Model object of the source machine platform and the Common Information Model object of the target machine platform, said migration task producing means, when generating migration tasks, resolves the dependency between the mapping paths, said Common Information Model object extracting means further extracts Common Information Model objects from said source machine platform and said target machine platform according to the resolved dependency until there is no further dependency, and said migration task producing means generates a migration subtask queue in a sequence consistent with the dependency.

8. The system according to claim 7, further comprising the migration subtask queue for storing the migration subtasks generated by said migration task producing means, wherein when said migration task producing means generates a migration subtask, said migration subtask is inserted into the migration subtask queue, and when all the migration subtasks are inserted, an end symbol is inserted.

9. The system according to claim 8, wherein when said migration task executing means executes the migration task, it acquires migration subtasks one by one from said migration subtask queue and executes them until reaching the end symbol.

10. The system according to claim 6, wherein said Common Information Model object extracting means, when extracting Common Information Model objects from said source machine platform, first acquires the source machine platform Common Information Model object type related to said personality of the computing environment according to the migration rules, and then extracts the Common Information Model object matching the acquired type from said source machine platform; and said Common Information Model object extracting means, when extracting Common Information Model objects from said target machine platform, first acquires the Common Information Model object type of said target machine platform corresponding to the Common Information Model object type of said source machine platform according to the migration rule, and then extracts from the target machine platform the Common Information Model objects matching the type of the target machine platform.

11. The system according to claim 6, further comprising a migration request processing means for processing the migration request of a user.

* * * * *